United States Patent
Ohyama

(10) Patent No.: US 8,555,084 B2
(45) Date of Patent: Oct. 8, 2013

(54) DATA ENCRYPTION DEVICE AND MEMORY CARD

(75) Inventor: Shigeo Ohyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 16 days.

(21) Appl. No.: 13/285,843

(22) Filed: Oct. 31, 2011

(65) Prior Publication Data

US 2012/0191984 A1    Jul. 26, 2012

(30) Foreign Application Priority Data

Jan. 21, 2011 (JP) ................................. 2011-010913

(51) Int. Cl.
G06F 11/30    (2006.01)
G06F 12/14    (2006.01)

(52) U.S. Cl.
USPC .......................................................... 713/189

(58) Field of Classification Search
USPC .......................................................... 713/189
See application file for complete search history.

(56) References Cited

U.S. PATENT DOCUMENTS

| | | | |
|---|---|---|---|
| 7,472,285 B2* | 12/2008 | Graunke et al. | 713/193 |
| 2005/0021986 A1* | 1/2005 | Graunke et al. | 713/193 |
| 2007/0081670 A1* | 4/2007 | Topham et al. | 380/239 |
| 2007/0110225 A1* | 5/2007 | Leventhal et al. | 380/28 |
| 2007/0140477 A1* | 6/2007 | Wise | 380/28 |
| 2008/0046756 A1* | 2/2008 | Dempski et al. | 713/187 |
| 2008/0301775 A1* | 12/2008 | Ollikainen et al. | 726/3 |
| 2009/0208018 A1* | 8/2009 | Buckingham et al. | 380/277 |

FOREIGN PATENT DOCUMENTS

| | | |
|---|---|---|
| JP | 11-225140 A | 8/1999 |
| JP | 2009-75474 A | 4/2009 |

OTHER PUBLICATIONS

Morris Dworkin, "Recommendation for Block Cipher Modes of Operation", Dec. 2001 Edition, NIST Special Publication 800-38A.

* cited by examiner

*Primary Examiner* — Kambiz Zand
*Assistant Examiner* — Stephen Sanders
(74) *Attorney, Agent, or Firm* — Birch, Stewart, Kolasch & Birch, LLP

(57) ABSTRACT

A data encryption device performs high-speed access to an arbitrary page when encrypting data and writing it to a storage device that can be accessed in a page unit or reading data therefrom and decrypting it. The device: encrypts data and writes it to the storage device or reads data from the storage device and decrypts it by a stream cipher; uses a counter mode of a block cipher to generate pseudorandom number series; specifies a data position in the storage device based on a page number and a page block number, by dividing one page into plural page blocks having a block length of the block cipher; and uses a value determined by a function of the page number, the page block number, and an arbitrary offset value, as an initial value of a pseudorandom number to be used in the counter mode.

6 Claims, 7 Drawing Sheets

DATA ENCRYPTION DEVICE AND MEMORY CARD

CROSS REFERENCE TO RELATED APPLICATION

This Nonprovisional application claims priority under 35 U.S.C. §119(a) on Patent Application No. 2011-010913 filed in Japan on Jan. 21, 2011 the entire contents of which are hereby incorporated by reference.

BACKGROUND OF THE INVENTION

1. Field of the Invention

The present invention relates to a data encryption device that encrypts secret data to be stored in a storage device and decrypts the secret data stored in the storage device, and particularly, relates to a data encryption method.

2. Description of the Related Art

As methods for encrypting secret information to store it in a storage device, there are public key encryption and common key encryption. For the common key encryption, the same key is used for both encryption and decryption. On the other hand, for the public key encryption, a set of two keys are used to perform encryption and decryption. That is, different keys are used for encryption and decryption. One of the two keys is used for a public key, and the other key is used for a secret key. For public key encryption, in the case of transmitting secret information to the other party, data is encrypted by using a public key of the other party, and the encrypted data is transmitted to the other party. Then, the other party can decrypt the transmitted data by using the own secret key, and obtains the decrypted secret information.

In general, public key encryption is used for authentication, electronic signature, or distribution of a common key. On the other hand, common key encryption is used for data concealment because common key encryption is faster than public key encryption.

For common key encryption, there are a block cipher and a stream cipher. Among these encryptions, a block cipher has a characteristic in that a plain text is not easily conjectured from a cipher text because data of an output block greatly changes when only one bit of an input block changes. However, because a process is performed for every one block, an encryption process cannot be progressed unless a certain amount of data is prepared.

On the other hand, in the case of a stream cipher, encryption and decryption are performed by an exclusive OR (XOR) of pseudorandom numbers and a plain text. Because pseudorandom numbers can be generated in advance and because a conversion process is simple, a large amount of data can be processed at a high speed. However, initial values (IV) of pseudorandom numbers need to be arranged at encryption and decryption times. Further, when a transmission error or the like occurs, encryption and decryption need to be reperformed by starting from a beginning of the data.

Further, a method using an OFB (Output Feedback) mode, a CFB (Cipher Feedback) mode, and a CTR (Counter) mode according to a block cipher, that combine the characteristic that a plain text of a block cipher is not easily conjectured and the high speed of a stream cipher, was invented by Morris Dworkin, "Recommendation for Block Cipher Modes of Operation", NIST Special Publication 800-38A, 2001.

As a general usage, a block cipher is used for encrypting a file, and a stream cipher is used for encrypting a large amount of data such as encryption of communications.

To perform encryption of data by building an encryption device in a storage device (a memory device) that performs writing and reading of data by page access, encryption is performed by using a block cipher for each page. However, in the case of a block cipher, an encryption process is started after data of a size corresponding to a block length are arranged, and access to the data becomes intermittent.

On the other hand, in the case of using a stream cipher, high-speed access becomes possible because there is no overhead other than generation of an initial value (IV). However, access needs to be performed always starting from a beginning of data, and access cannot be performed from an arbitrary page.

To solve a problem that access cannot be performed from an arbitrary position in the stream cipher, Japanese Patent Application Laid-open Publication No. 11-225140 discloses a method for making it possible to perform access from an arbitrary position by embedding inserted-information identification information and an initial value (IV) into a data row. However, when an initial value (IV) is set for each page of the storage device, the initial value (IV) is required to be set again each time when a continuous access is performed by striding pages, and overhead occurs. Further, this inserted information is redundant, and this means holding unnecessary data.

SUMMARY OF THE INVENTION

In view of the above situation, the present invention has an object of providing a data encryption device that can perform high-speed access to an arbitrary page in writing and reading encrypted data containing secret information, and a memory card that is mounted with the data encryption device.

To achieve the above object, a data encryption device according to the present invention has the following first characteristic. The data encryption device encrypts data to be stored in a storage device by a stream cipher and writes the encrypted data to the storage device, or reads the encrypted data from the storage device and decrypts the read data by the stream cipher. The storage device can be accessed in a page unit. The data encryption device uses a counter mode of a block cipher to generate pseudorandom numbers for encryption or decryption. The page is divided into a plurality of page blocks that have the same block length as a block length of the block cipher. Encryption or decryption is performed in a counter mode of the block cipher in the divided page block unit. A position of the data to be written or read in the page is specified by a page block number of each of the page blocks. A value obtained by a function of a page number and the page block number of the page to be written or read is used as an initial value for generating the pseudorandom numbers.

According to the data encryption device of the first characteristic, the data encryption device can perform high-speed access by using a stream cipher as an encryption system and by using a CTR (a counter) mode of a block cipher to generate pseudorandom number sequence. Because the data encryption device can determine an initial value by a page number and a page block number, the device can access an arbitrary page by striding pages.

The data encryption device of the first characteristic further has a following second characteristic. The device uses a value obtained by a function of an offset value, in addition to the page number and the page block number of the page to be written or read, as an initial value for generating the pseudorandom numbers. The offset value is different for each data encryption device.

According to the data encryption device of the second characteristic, when an initial value is set as a function of an offset value, strength of security can be increased because an initial value is different for each encryption device.

Examples of the function of an initial value are explained below.

It is preferable, for example, that the initial value is expressed as a value obtained by concatenating the page number to a high-order bit side of the page block number. In this case, the initial value IV is expressed as $IV(n_{PG}, m_{BLK}) = n_{PG} \cdot M + m_{BLK}$, where $n_{PG}$ denotes a page number, $m_{BLK}$ denotes a page block number, and M denotes a page block number per one page. The initial value IV only has to be incremented by one to perform a continuous access that strides each page. Therefore, this becomes the same operation as that of a counter.

When the above IV is a function of an offset value "offset", it is more preferable that the initial value is expressed as a value obtained by adding the offset value to a pre-initial value obtained by concatenating the page number to a high-order bit side of the page block number. In this case, the initial value IV is expressed as $IV(n_{PG}, m_{BLK}, \text{offset}) = n_{PG} \cdot M + m_{BLK} + \text{offset}$.

Alternatively, the initial value IV can be an exclusive OR of a pre-initial value and an offset value, instead of adding the offset value to the pre-initial value. That is, the initial value can be expressed by an exclusive OR of a pre-initial value obtained by concatenating the page number to the high-order bit side of the page block number and the offset value.

Preferably, the data encryption device of the first or second characteristic uses AES (Advanced Encryption Standard) as an encryption algorithm of the block cipher. An encryption device of high security can be achieved by generating a pseudorandom number sequence by using an AES cipher.

The present invention provides a memory card that is mounted with the storage device, and the data encryption device of the first or second characteristic, and can achieve a memory card that has high security and can perform both random page access and high-speed reading by mounting the data encryption device of the above characteristic on a memory card that is detachably installed in an electronic device such as a personal computer, a digital camera, and a portable telephone.

Therefore, according to the present invention, it is possible to provide a data encryption device that can perform high-speed access to an arbitrary page and a memory card that is mounted with the data encryption device.

DESCRIPTION OF THE PREFERRED EMBODIMENTS

First Embodiment

Figure 1:
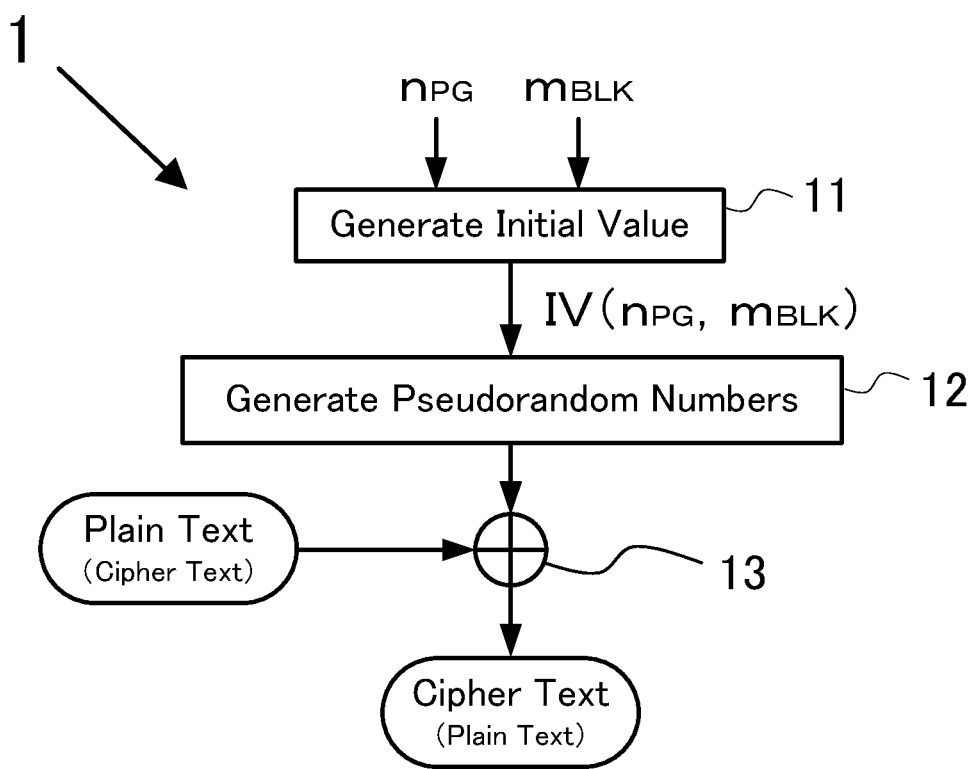
FIG. 1 is a block diagram showing a configuration example of a circuit of a data encryption device according to the present invention.

FIG. 1 shows a configuration example of a data encryption device 1 (hereinafter, appropriately, "present invention device 1") according to an embodiment of the present invention. FIG. 1 is a block diagram showing a circuit configuration of the invention device 1, and the invention device 1 is configured to use a CTR (a counter) mode of a block cipher to encrypt data. As shown in FIG. 1, the invention device 1 includes an initial-value generating circuit 11, a pseudorandom-number generating circuit 12, and an exclusive OR circuit 13. Further, the invention device 1 transmits/receives data to/from a storage device 14 (not shown) that can be accessed in a page unit, and performs a decryption process of encrypted read data or an encryption process of data to be stored to the storage device. A control circuit 15 (not shown) controls a read operation of data stored in the storage device 14 and a write operation of data to be stored in the storage device 14. In the read operation, the invention device 1 receives data (a cipher text) of a predetermined read address via the control circuit 15, decrypts the read data, and converts the decrypted data into plain text data. On the other hand, in the write operation, the invention device 1 encrypts data (a plain text) to be stored, and transmits the encrypted data to the control circuit 15 to write the data into a predetermined write address of the storage device 14. Therefore, the invention device 1 and the storage device can be electrically connected to each other like a memory card that is detachable to an electronic device such as a personal computer, or can be connected to each other in a network via wired or wireless LAN.

Operation of the invention device 1 that encrypts data and writes the encrypted data into a predetermined address of the storage device is explained below.

The initial-value generating circuit 11 sets an initial value IV $(n_{PG}, m_{BLK})$ as a function of $n_{PG}$ and $m_{BLK}$, based on a page number $n_{PG}$ of a page to be accessed, and a page block number $m_{BLK}$. Then, the pseudorandom-number generating circuit 12 generates a pseudorandom number in a counter mode of a block cipher based on the IV $(n_{PG}, m_{BLK})$. A size of the pseudorandom number is equal to a block length L of the block cipher to be used. The IV $(n_{PG}, m_{BLK})$ corresponds to a count value in a counter mode of the block cipher to be used.

Because data is encrypted or decrypted in a block unit of a block length of the block cipher, each page is divided into plural blocks of a block length L, and each divided block is called as a page block. In the page, the divided page blocks are ordered by page block numbers. Accordingly, a position of a page block in the page is specified by the page block number $m_{BLK}$.

The exclusive OR circuit 13 performs an exclusive OR (XOR) of a pseudorandom number generated by the pseudorandom-number generating circuit 12 and a plain text, and outputs a cipher text. The cipher text is written into a predetermined address of the storage device specified by the page number $n_{PG}$ and the page block number $m_{BLK}$, via the control circuit.

In a subsequent continuous writing, the initial-value generating circuit 11 further sets an initial value $IV(n_{PG}, m_{BLK}+1)$ that is obtained by adding 1 to the page block number $m_{BLK}$. The pseudorandom-number generating circuit 12 generates a pseudorandom number based on the $IV(n_{PG}, m_{BLK}+1)$. The exclusive OR circuit 13 performs an exclusive OR (XOR) of this pseudorandom number and a plain text, and outputs a cipher text.

Figure 2:
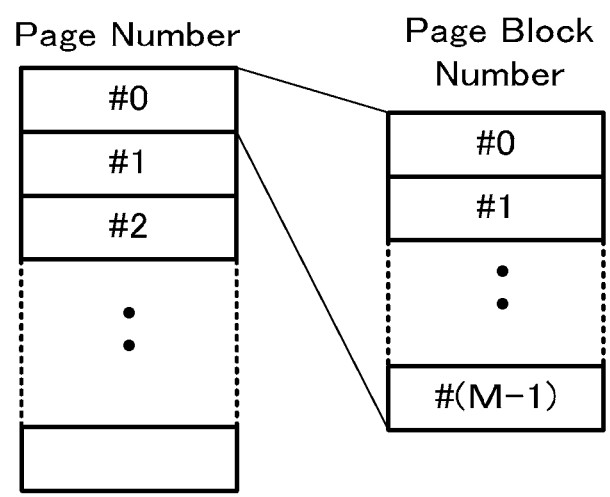
FIG. 2 shows a relationship between a page and a page block.

FIG. 2 shows a relationship between a page and a page block. When a page size is N and a total number of divided page blocks in each page is M, M=N/L. When a page #0 is accessed, for example, a count value that shows a page block number is sequentially added by one from #0 to #M−1, during the access to the page #0. After the access to the page #0 and the page block number #M−1, at a subsequent continuous access, a count value that indicates a page block number is reset to #0, and a count value that indicates a page number is added by one, and access to a page block that belongs to the page #1 is started. Therefore, $IV(n_{PG}, M)=IV(n_{PG}+1, 0)$.

Figure 3:
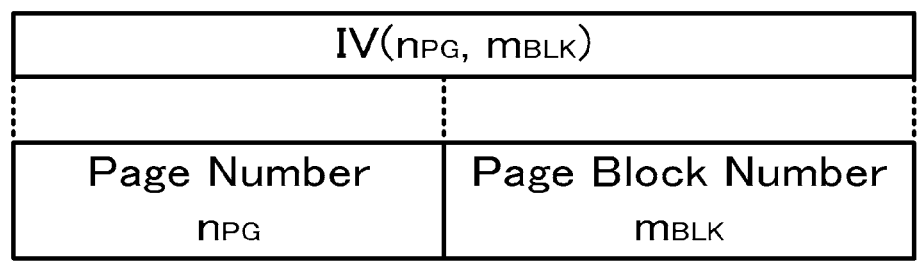
FIG. 3 shows an example of a setting of an initial value IV of a pseudorandom number.

FIG. 3 shows an example of the function $IV(n_{PG}, m_{BLK})$ for setting an initial value. In the example shown in FIG. 3, the initial value IV is set by concatenating binary numbers that indicate a page number $n_{PG}$ and a page block number $m_{BLK}$. Specifically, $IV(n_{PG}, m_{BLK})=n_{PG} \cdot M+m_{BLK}$. Accordingly, after the access to the page #0 and the page block number #M−1, at the subsequent continuous access, access to the page #1 and the page block number #0 is started. In this case, it is also sufficient that only the initial value IV is added by one.

That is, the initial value IV is equivalent to a count value that indicates a cumulative number of times of generating a cipher text. Even in the case of access that strides pages, a cipher text can be generated by sequentially adding one to the initial value IV, to perform continuous writing. As a result, a unique initial value IV can be set by performing continuous access or random access.

Because the initial value IV shows a count value that indicates a cumulative number of times of generating a cipher text until then, as described above, one counter can be used as a configuration of the initial-value generating circuit 11.

When an error or the like occurs in the middle of writing, it is not necessary to reperform a write operation starting from the beginning. Generation of a cipher text can be started again by setting the initial value of the counter to $IV(n_{PG}, m_{BLK})$, by returning to the page number $n_{PG}$ and the page block number $m_{BLK}$ where the error occurred. A write operation can be started again from the page number $n_{PG}$ and the page block number where the error occurred.

Figure 4:
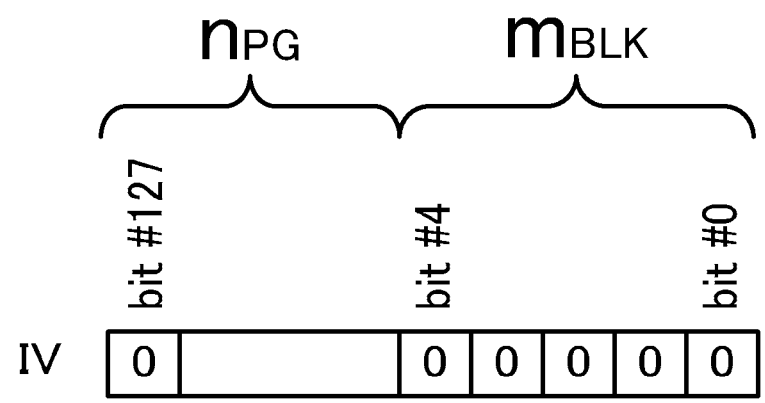
FIG. 4 shows an example of a setting of an initial value IV of a pseudorandom number when the present invention is used to encrypt data in an SD card.

Consider that the invention device 1 is mounted on an SD card as a memory card and that data generated by a personal computer or the like is encrypted and stored in this SD card, for example. A memory size per one page of the SD card is 512 bytes (4096 bits). Meanwhile, assume that AES of a block length 128 bits is used for an encryption algorithm. Consequently, one page has 32 page blocks. In this case, low-order five bits of a bit #0 to a bit #4 are allocated to a page block number and high-order bits of a bit #5 to a bit #127 are allocated to a page number, as an example of the setting of the initial value IV (128 bits), as shown in FIG. 4.

Second Embodiment

Figure 5:
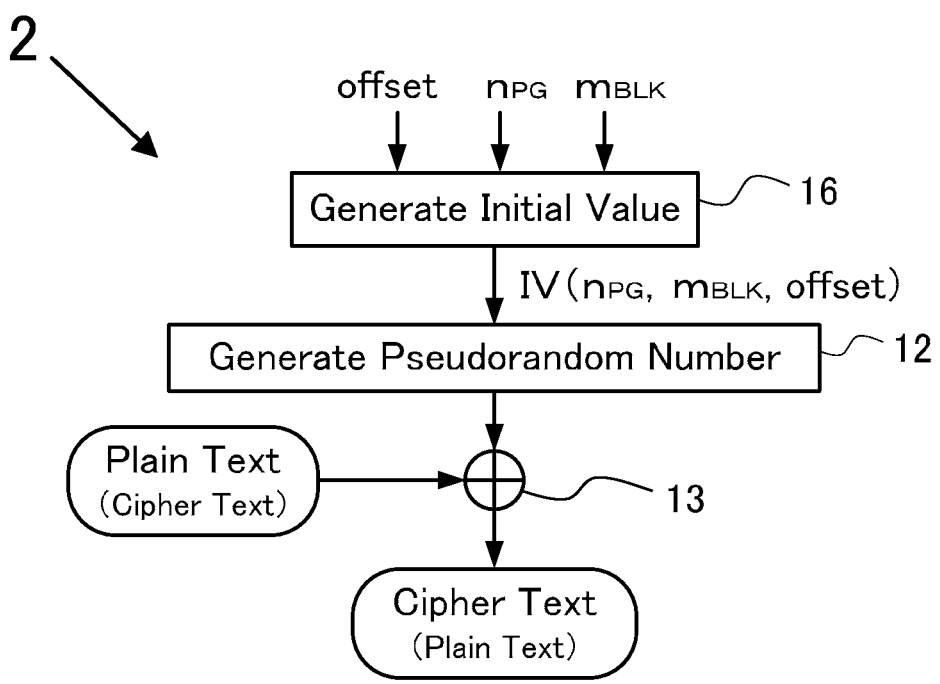
FIG. 5 is a block diagram showing other configuration example of a circuit of a data encryption device according to the present invention.

FIG. 5 shows a configuration example of a data encryption device 2 (hereinafter, appropriately "invention device 2") according to one embodiment of the present invention. In the invention device 2, an initial-value generating circuit 16 sets an initial value IV of a pseudorandom number, as a function of an arbitrary offset value "offset", in addition to the page number $n_{PG}$ and the page block number $m_{BLK}$.

Figure 6:
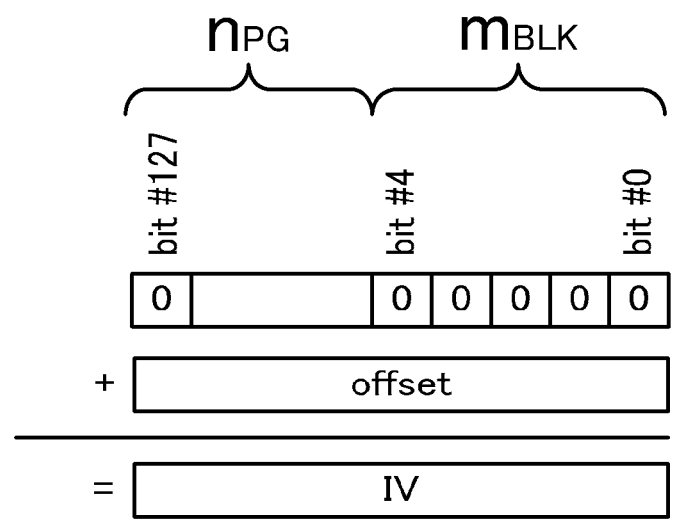
FIG. 6 shows other example of a setting of an initial value IV of a pseudorandom number.

FIG. 6 shows an example of a setting of the initial value IV according to the invention device 2. In the example shown in FIG. 6, the initial value IV is generated by further adding an offset value offset to a value (a pre-initial value) that is set from the page number $n_{PG}$ and the page block number $m_{BLK}$.

In this case, the initial value IV specifically becomes $IV(n_{PG}, m_{BLK}, \text{offset})=n_{PG} \cdot M+m_{BLK}+\text{offset}$.

By changing this offset value for each one data encryption device 2, different pseudorandom number sequences can be generated by the same encryption key, and different cipher texts can be generated. Accordingly, dead copy of data in storage devices can be prevented between storage devices that are controlled by different data encryption devices 2.

Figure 7:
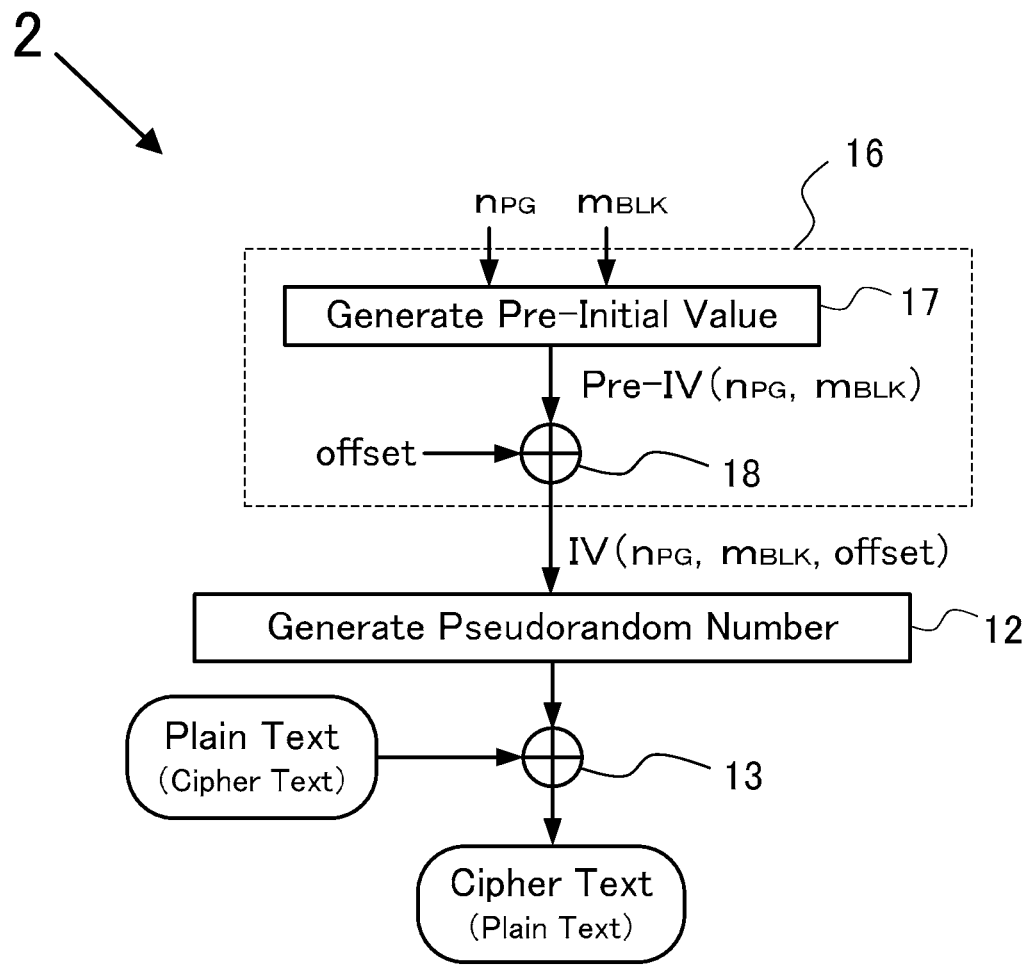
FIG. 7 shows other configuration example of an initial-value generating circuit of a pseudorandom number.

FIG. 7 shows other configuration example of the initial-value generating circuit 16 that uses the offset value offset as an input. The initial-value generating circuit 16 shown in FIG. 16 consists of a pre-initial-value generating circuit (a counter) 17 and an exclusive OR circuit 18. The initial-value generating circuit 16 generates an initial value $IV(n_{PG}, m_{BLK}, \text{offset})$ by an exclusive OR of a pre-initial value Pre-IV that is set by the pre-initial-value generating circuit 17 based on the page number $n_{PG}$ and the page block number $m_{BLK}$, and the offset value offset.

In a similar manner to a manner in which the initial-value generating circuit 11 sets the initial value IV as a function of the page number $n_{PG}$ and the page block number $m_{BLK}$ in FIG. 3, the pre-initial-value generating circuit 17 sets the pre-initial value Pre-IV as a function of the page number $n_{PG}$ and the page block number $m_{BLK}$ in FIG. 7. With this arrangement, the pre-initial value Pre-IV is equivalent to a count value that indicates a cumulative number of times of generating a cipher text until then. Even in the case of access that strides pages, a cipher text can be continuously generated by sequentially adding one to the pre-initial value Pre-IV in a continuous writing.

Further, by generating the initial value IV by the exclusive OR of the pre-initial value Pre-IV and the offset value offset, dead copy of data can be prevented by changing the offset value for each data encryption device, and strength of security can be increased.

A case where the invention device 1 or 2 encrypts data and stores the encrypted data in the storage device is explained in detail above. In the case of decrypting data that is encrypted and stored, only a relation between a cipher text and a plain text becomes opposite, and a similar configuration can be used. Because the initial-value generating circuit 11 (16) can generate the same initial value IV as that at the encryption time based on the page number and the page block number, the pseudorandom-number generating circuit 12 generates a pseudorandom number by using the same initial value IV as that at the encryption time, and the exclusive OR circuit 13 can restore a plain text by performing an exclusive OR of the pseudorandom number and a cipher text.

A modification is explained below.

(1) In the above embodiments, although high-order bits are allocated to a page number and low-order bits are allocated to a page block number as an example of setting an initial value IV, the present invention is not limited to this. For example, conversely, high-order bits can be allocated to a page block number and low-order bits can be allocated to a page number. low-order odd bits can be allocated to a page block number. Alternatively, an inversion of bits corresponding to a page block number or a page number can be set as an initial value IV. The present invention can be applied as long as an initial value IV can be uniquely determined as a function of a page number and a page block number.

The present invention can be used to encrypt and decrypt data that is stored in a storage device, and particularly, can be used as a memory card that can perform high-speed access to an arbitrary page of data containing secret information and that has high security.

Although the present invention has been described in terms of the preferred embodiment, it will be appreciated that various modifications and alternations might be made by those skilled in the art without departing from the spirit and scope of the invention. The invention should therefore be measured in terms of the claims which follow.

What is claimed is:

1. A data encryption device that
encrypts data to be stored in a storage device by a stream cipher and writes the encrypted data to the storage device, or reads the encrypted data from the storage device and decrypts the read data by the stream cipher, the storage device being accessed in a page unit, and
uses a counter mode of a block cipher to generate pseudorandom numbers for encryption or decryption, wherein
the page is divided into a plurality of page blocks that have the same block length as a block length of the block cipher, and encryption or decryption is performed in a counter mode of the block cipher in the divided page block unit,
a position of the data to be written or read in the page is specified by a page block number of each of the page blocks, and
a value obtained by a function of a page number and the page block number of the page to be written or read, and an offset value which is constant in encryption or decryption but different for each data encryption device is used as an initial value for generating each of the pseudorandom numbers.

2. The data encryption device according to claim 1, wherein
the initial value is expressed as a value obtained by adding the offset value to a pre-initial value obtained by concatenating the page number to a high-order bit side of the page block number.

3. The data encryption device according to claim 1, wherein
the initial value is expressed as an exclusive OR of a pre-initial value obtained by concatenating the page number to a high-order bit side of the page block number, and the offset value.

4. The data encryption device according to claim 1, wherein
AES is used for an encryption algorithm of the block cipher.

5. A memory card which is mounted with a storage device that is accessed in a page unit, and the data encryption device according to claim 1.

6. A data encryption device that encrypts data to be stored in a storage device by a stream cipher and writes the encrypted data to the storage device, or, reads the encrypted data from the storage device and decrypts the read data by the stream cipher, the storage device being accessed in a page unit, comprising:
a pseudorandom-number generating circuit to generate a pseudorandom number in a counter mode of a block cipher,
an initial-value generating circuit to generate an initial value for generating the pseudorandom number,
an exclusive OR circuit, the exclusive OR circuit outputting a cipher text by performing exclusive OR of a plain text by performing exclusive OR of a cipher text and the pseudorandom number, wherein
the page is divided into a plurality of page blocks that have the same block length as a block length of the block cipher, so that a position of the data to be written or read in the page is specified by a page block number of each of the page blocks,
the initial-value generating circuit generates the initial value for each of the page blocks, as a function of a page number and the page block number of the page to be written or read, and an offset value which is constant in encryption or decryption but different for each data encryption device, and
the exclusive OR circuit performs an exclusive OR operation for each of the page blocks.

* * * * *